United States Patent
Obayashi et al.

[11] Patent Number: 6,118,247
[45] Date of Patent: Sep. 12, 2000

[54] DRIVE CONTROL APPARATUS FOR ELECTRIC SYNCHRONOUS MACHINE HAVING FIELD WINDING

[75] Inventors: Kazuyoshi Obayashi, Chita-gun; Hiroya Tsuji, Yokkaichi; Tsuneyuki Egami, Gamagori, all of Japan

[73] Assignee: Denso Corporation, Kariya, Japan

[21] Appl. No.: 09/290,550

[22] Filed: Apr. 12, 1999

[30] Foreign Application Priority Data

Apr. 28, 1998 [JP] Japan .................................. 10-119508

[51] Int. Cl.⁷ ...................................................... H02P 1/46
[52] U.S. Cl. ........................ 318/712; 318/705; 318/714; 318/716; 318/720
[58] Field of Search .................... 318/712, 705, 318/714, 716, 720

[56] References Cited

U.S. PATENT DOCUMENTS 4,366,420 12/1982 Ackermann et al. .................... 318/139
5,157,228 10/1992 Ackermann et al. .................... 388/806
5,955,807 9/1999 Kajiura .

FOREIGN PATENT DOCUMENTS 9-74607   3/1997  Japan .
10-304633 11/1998 Japan .

Primary Examiner—Karen Masih
Attorney, Agent, or Firm—Pillsbury Madison & Sutro LLP

[57] ABSTRACT

A drive control apparatus for an electric synchronous machine is composed of armature current control means and transient operation detection means. When the synchronous machine is intended to increase power in a transient operation, the current control means supplies the armature winding with compensation current to cancel counter-electromotive force formed when field current is supplied to the field winding through a mutual inductance of the field winding and the armature winding.

6 Claims, 7 Drawing Sheets

DRIVE CONTROL APPARATUS FOR ELECTRIC SYNCHRONOUS MACHINE HAVING FIELD WINDING

CROSS REFERENCE TO RELATED APPLICATION

The present application is based on and claims priority from Japanese Patent Application Hei 10-119508 filed on Apr. 28, 1998, the contents of which are incorporated herein by reference.

BACKGROUND OF THE INVENTION

1. Field of the Invention

The present invention relates to a drive control apparatus of an electric synchronous machine having a field winding.

2. Description of the Related Art

An electric synchronous machine is composed of a three-phase armature winding and a field winding. The armature winding has three phase-windings which are supplied respectively with driving phase-current iu, iv and iw. Voltage Vf is applied across the field winding to supply field current if, thereby generating field magnetic flux.

The field current may be controlled in a vector control process using d-q rectangular coordinate axes with the magnetic field component set on one of the axes.

A synchronous electric machine disclosed in JP-A-9-74607 is mounted in a parallel hybrid vehicle together with an engine and an infinite variable-speed transmission. The synchronous machine is not used when the vehicle is driven at a constant speed but is used only when the vehicle is in a transient operation such accelerated or decelerated.

Preferably, the field current should be supplied only when the vehicle is accelerated or decelerated to improve the power efficiency of the hybrid vehicle. However, in the conventional drive control apparatus can not increase the field current immediately when driving power or battery charging energy of the synchronous machine is needed during the transient operation. If field voltage Vf is applied to the field winding, counter-electromotive force ef is generated as expressed in the following expression.

$$ef = Lf \, (dif/dt), \qquad [E1]$$

where Lf is an inductance of the field winding.

The counter electromotive force ef impedes increase in the field current if and, in turn, increase in magnetic flux $\phi f$.

SUMMARY OF THE INVENTION

The invention is made in view of the above problems, and a main object of the invention is to provide an improved drive control apparatus which can improve rise-up of the field magnetic flux.

In order to attain the above object, a drive control apparatus according to a main feature of the invention is composed of detection means for detecting a torque command signal commanding output power of the synchronous machine, judge means for judging transient operation of the synchronous motor according to the torque command signal, field control means for supplying field current to the field winding when the transient operation is detected, armature control means for controlling basic armature current according to the torque command signal to provide commanded output power; and compensation means for adding an amount of compensation current component to the basic armature current to generate electromotive force in the field winding through a mutual inductance between the field winding and the armature winding to cancel counter-electromotive force generated when the field current is supplied.

Accordingly, the rise-up time of the field magnetic flux is improved and torque response is improved.

The principle of the vector control according to the invention is described with reference to FIG. 7. In a graph of d-q rectangular axes, the magnetic field of field winding F is put on d-axis, and component id of the armature current of armature winding S is put on d-axis. A counter electromotive force ef is generated in the field winding as expressed in the following expression [E2].

$$ef = Lf \cdot (dif/dt) - Mfd \cdot (did/dt) \qquad [E2]$$

Here, Lf is an inductance of the field winding, and Mfd is a mutual inductance between the field winding and the armature winding. Because the electromotive force $Mfd \cdot (did/dt)$ acts to cancel the counter-electromotive force ef, the rise up speed of the field magnetic flux can be increased.

Practically, in the drive control apparatus according to the invention, the armature control means calculates a target amount of magnetic flux necessary to provide the commanded output power, an amount of a component of the basic armature current generating the commanded output power. The armature control means also calculates the amount of compensation current component from a difference between the target magnetic flux and actual magnetic flux.

According to another feature of the invention, the compensation amount can be calculated from a difference between a target field current and an actual field current.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A drive control apparatus according to a preferred embodiment of the invention is described with reference to the appended drawings.

Figure 1:
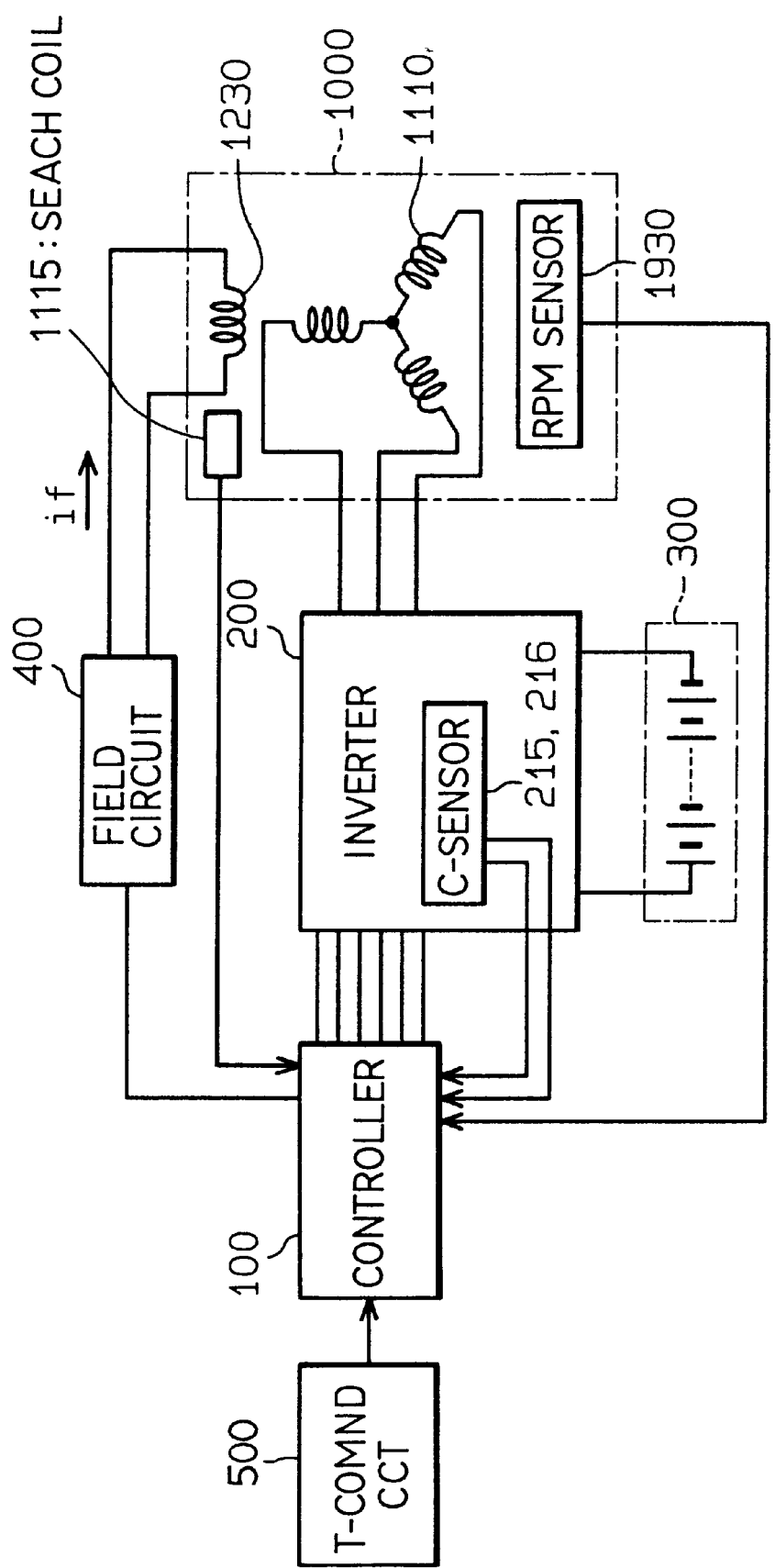
FIG. 1 is a diagram showing a structure of a drive control apparatus of an electric vehicle according to a preferred embodiment.

In FIG. 1, the control apparatus is connected to synchronous motor 1000 which has three-phase armature winding 1110 and a field winding 1230. Motor 100 is mounted as a driving source in an electric vehicle.

The control apparatus is composed of controller 100, inverter 200, battery unit 300 and field control circuit 400.

Controller 100 has a microcomputer, which receives a torque command signal, which is provided by torque command circuit 500 when an accelerator or a brake pedal is operated. Controller 100 controls motor 1000 in response to the torque command signal according to programs stored in a ROM. Controller 100 has a signal process section which detects the position of rotor 1200 according to a signal from rotor position sensor 1930.

Inverter 200 is connected to controller 100, battery unit 300 and three input terminals of armature winding 1110.

Figure 2:
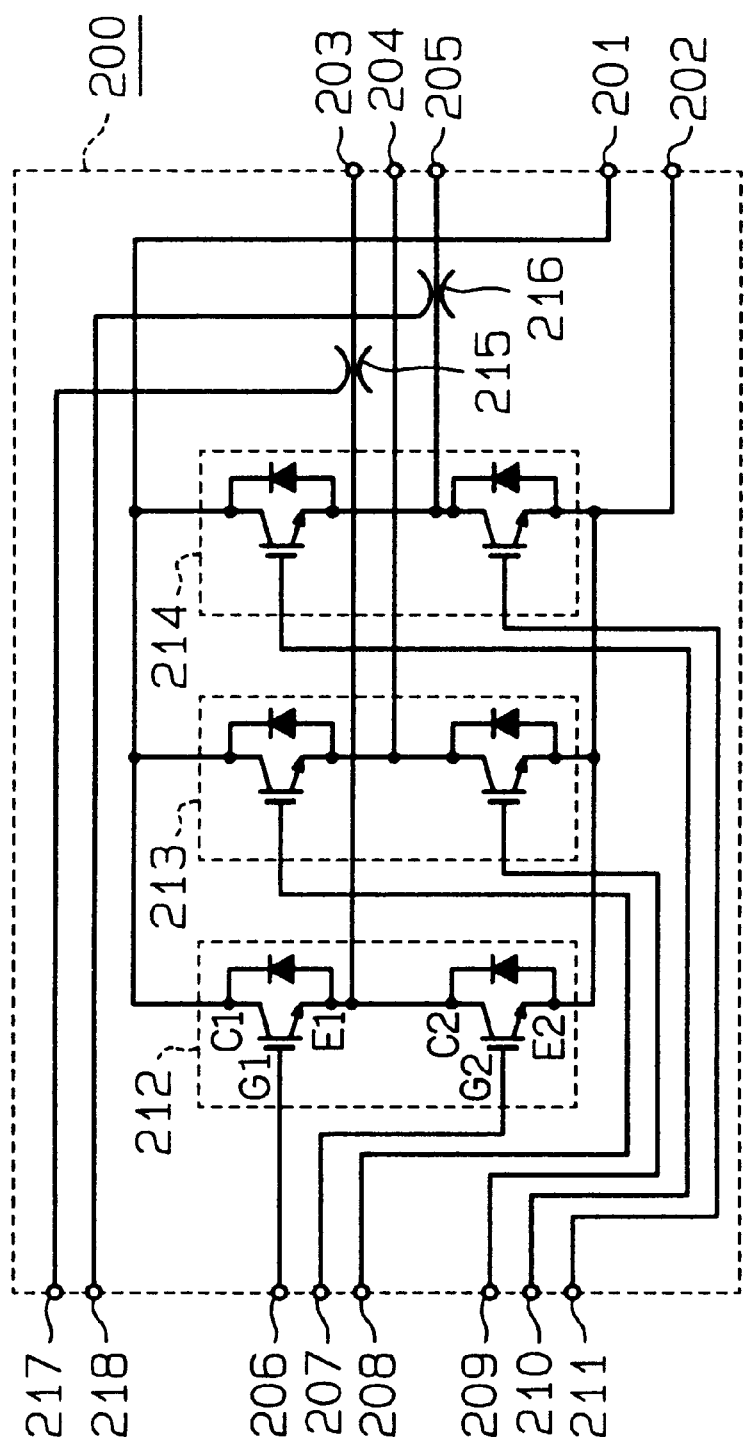
FIG. 2 is a circuit diagram of an inverter circuit of the drive control apparatus according to the preferred embodiment.

As shown in FIG. 2, inverter 200 has main input terminals 201, 202 connected to plus and minus terminals of battery unit 300, output terminals 203, 204, 205 connected respectively to U, V, W-phase windings of motor 1000, and input terminals 206, 207, 208, 209, 210, 211 connected to gate drive circuits (not shown) of controller 100.

Inverter also has IGBT modules 212, 213, 214, current sensors 215, 216 and output terminals 217, 218 thereof.

Each of IGBT modules 212, 213, 214 has two sets of an IGBT element (insulation gate type bi-polar transistors) and a o flywheel diode, which are well-known. IGBT module 212 has terminal C1 connected to main input terminal 201, terminal E2 connected to main terminal 202, and terminals E1 and C2 jointly connected to output terminal 203, thereby forming a drive circuit for the U-phase winding of motor 1000. IGBT modules 213, 214 have also substantially the same components as IGBT module 212 forming drive circuits for the V-phase and W-phase windings.

Current sensors 215, 216 are fixed to lead wires respectively connected to terminals 203, 205, and connected to controller 100 through terminals 217, 218. Each of current sensors 215, 216 is composed of a Hall element and is a clamp-and-non-contact type sensor. current sensors 215, 216 respectively detect output current of terminal 203, 205 and provide voltage signals. That is, current sensor 215 detects current iu of U-phase winding, and current sensor 216 detects current iw of W-phase winding.

Field control circuit 400 is connected to controller 100 and to field winding 1230 to control field current if supplied thereto. Inverter 200 and field control circuit 400 are controlled by controller 100.

Figure 3:
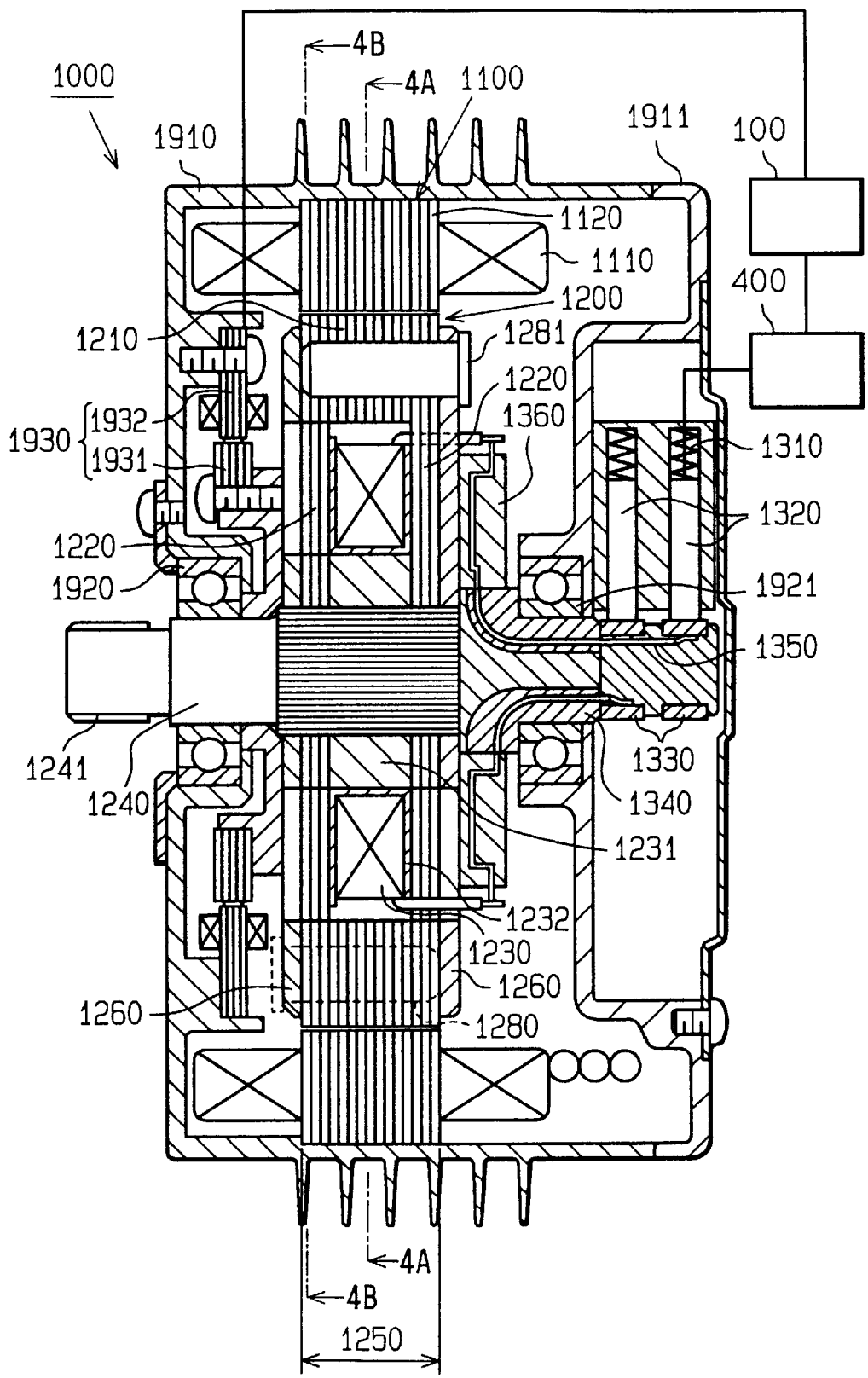
FIG. 3 is a longitudinally cross-sectional view of a motor mounted in an electric vehicle to be controlled by the drive control apparatus according to the embodiment.
Figure 4A:
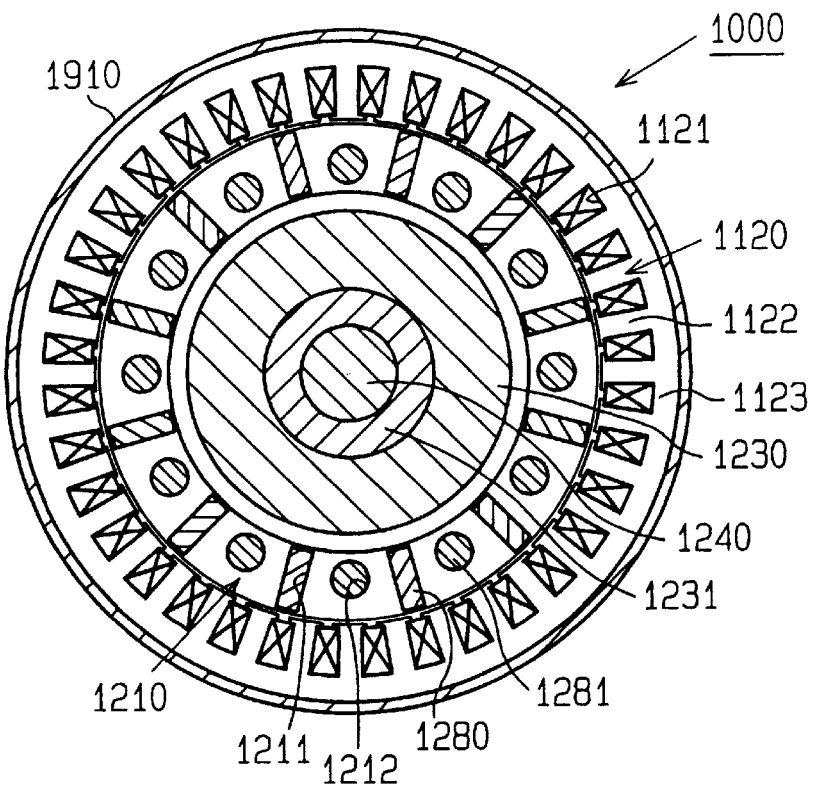
FIG. 4A is a cross-sectional view of the motor shown in FIG. 3 cut along line 4A–4A.
Figure 4B:
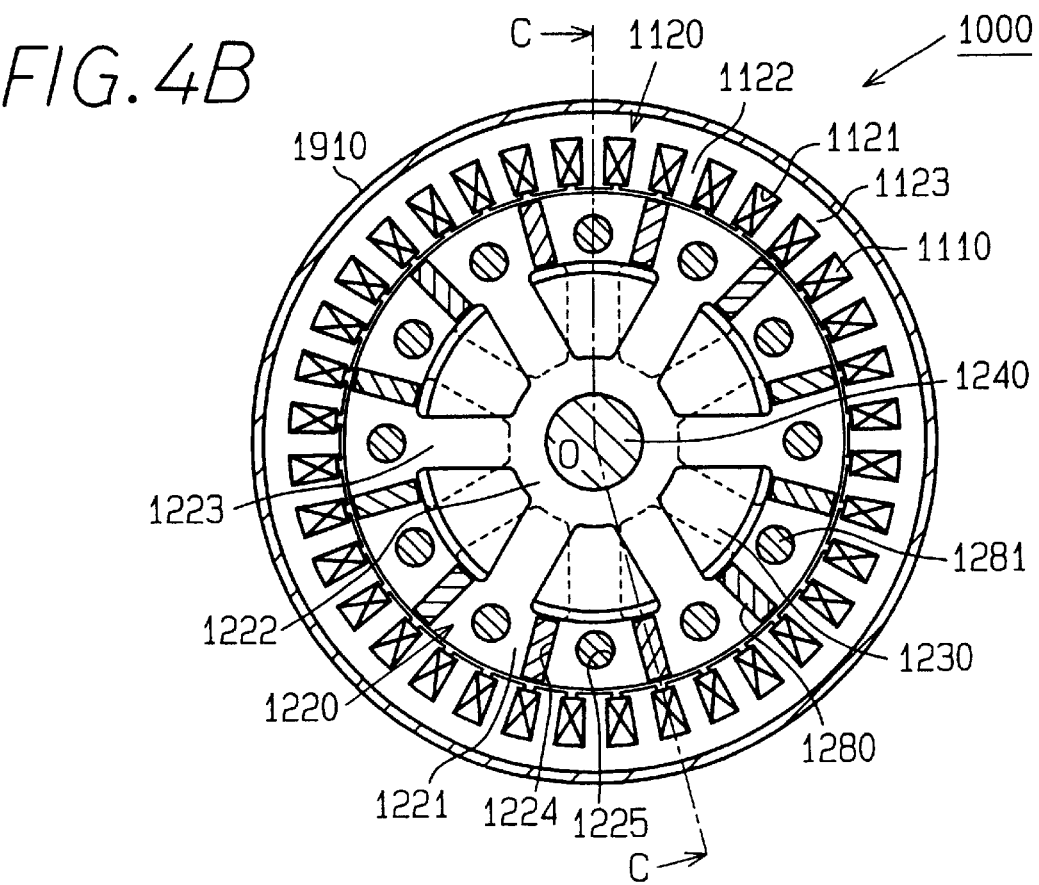
FIG. 4B is a cross-sectional view of the motor shown in FIG. 3 cut along line 4B–4B.

As shown in FIGS. 3, 4A and 4B, motor 1000 is composed of front frame 1910, end frame 1911, stator 1100 housed in frames 1910, 1911, a pair of bearings 1920, 1921, rotor 1200 respectively and rotatably supported by frames 1910, 1911 via the pair of bearings 1920, 1921, and rotor position sensor 1930. Rotor 1200 rotates at an air gap radially inner side of stator 1100.

Rotor position sensor 1930 is composed of a known set of resolver rotor 1931 and resolver stator 1932 which is connected to controller 100. Controller 100 calculates rotor position a according to the signal from rotor position sensor 1930.

Stator 1100 is composed of three-phase winding 1110 and stator core 1120 which is a lamination of a plurality of electric steel sheets. Stator core 1120 has a plurality of slots 1121, teeth 1122 and core back portion 1123 to accommodate three-phase armature winding 1110.

Rotor 1200 is composed of rotor yoke 1210 which is a cylindrical lamination of a plurality of electric steel sheets, a pair of wheel-like rotor yokes 1220 which is a lamination of a plurality of electric steel sheet disposed opposite ends of rotor yoke 1210, and field winding 1230 disposed inside rotor yoke 1210. Cylindrical rotor yokes 1210, the pair of wheel-like rotor yokes 1220 and field winding 1230 form magnetic circuit section 1250. A pair of nonmagnetic plates 1260 is disposed on the opposite ends of magnetic circuit section 1250.

In magnetic circuit section 1250, cylindrical iron core 1231 is press-fitted to shaft 1240 at a serrated portion thereof and resinous bobbin 1232 is fixed on the outer periphery of iron core 1231. Field winding 1230 is wound on bobbin 1232 in one way direction. A spline 1241 is formed on a left portion of shaft 1240 in FIG. 3. Shaft 1240 is the output shaft of motor 1000 to be connected to vehicle wheels (not shown).

Field winding 1230 is supplied with field current by field control circuit 400 through brush holders 1310, brushes 1320, slip rings 1330 and lead wires 1350. Lead wires 1350 are integrated with shaft 1240 by resinous insulating mold 1340.

As shown in FIG. 4A, rotor yoke 1210 has twelve magnet holes 1211 on a circumference at equal intervals. Twelve permanent magnets are inserted in magnetic holes 1211 respectively. Rotor yoke 1210 also has twelve round holes 1212 formed between magnet holes 1211.

As shown in FIG. 4B, rotor yoke 1220 has annular portion 1221, hub portion 1222 and six spokes 1223 connecting annular portion 1221 and hub portion 1222. In other words, spokes 1223 are spaced apart from one another at 720/12 (12 is the number of poles) or 60 degree in angle. Annular portion 1221 has twelve magnet holes 1224, as in rotor yoke 1210, on a circumference at equal intervals and round holes 1225 formed at circumferentially central portions between magnet holes 1224 adjacent to each other. Magnet holes 1211 of rotor yoke 1210 are the same in shape and size as magnet holes 1224 of rotor yoke 1220, and round holes 1212 are also the same in shape and size as round holes 1225. Accordingly, the magnet circuit section has 24 through holes extending from one axial end thereof to the other. In FIG. 3, a pair of right and left rotor yokes 1220 is assembled so that spokes 1223 of one can not circumferentially overlap with spokes 1223 of the other.

Permanent magnets 1280 are inserted respectively into magnet holes 1211, 1224 in the direction perpendicular to the figure so that one circumferential side of one of permanent magnets has the same polarity as the other circumferential side of another permanent magnet adjacent thereto. Soft iron pins 1281 are also press-fitted to respective round holes 1212, 1225 to join rotor yokes 1210, 1220 together.

Permanent magnets 1280 are magnetized in the circumferential direction to provide N and S poles alternately on the outer periphery of rotor 1200. The magnetic flux bypasses from the N pole of permanent magnets 1280 to the S pole thereof through N-pole-side soft iron pin 1281, N-pole-side spoke 1223, iron core 1231, S-pole-side spoke 1223, and S-pole-side soft iron pin 1281. Thus, bypassing circuits of the magnetic flux of the permanent magnets 1280 are provided. Accordingly, reluctance of the bypassing circuit can be controlled, and the effective magnetic flux that is supplied to the stator through the air gap can be controlled whether field winding 1230 is energized or not.

Motor 1000 is controlled in a vector control mode according to torque command signal T*, rotor position θ, amounts of currents of the U-phase and W-phase windings detected by current sensors 215, 216.

Figure 5:
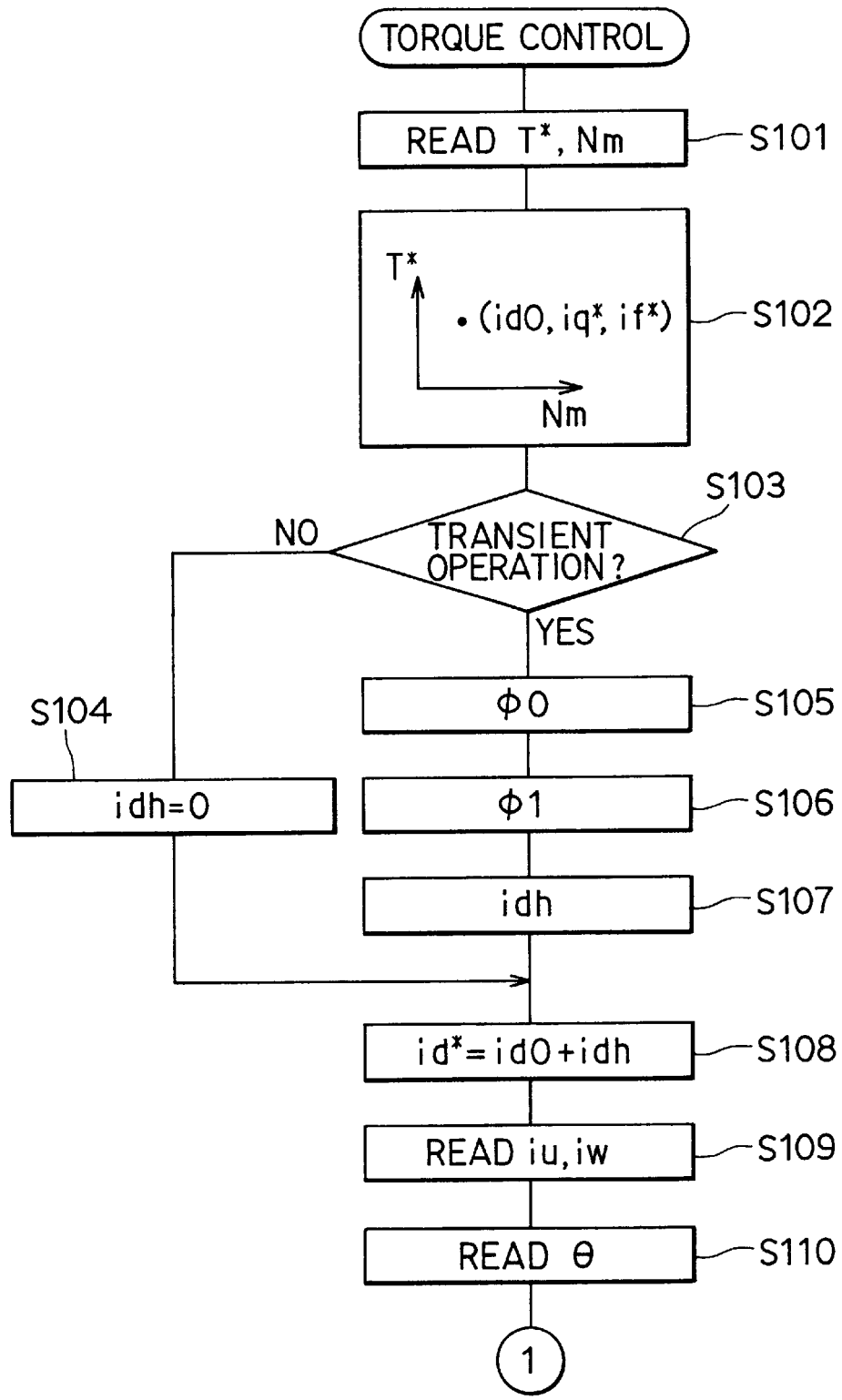
FIG. 5 is a flow diagram of a part of a main program for a controller of the drive control apparatus according to the embodiment.
Figure 6:
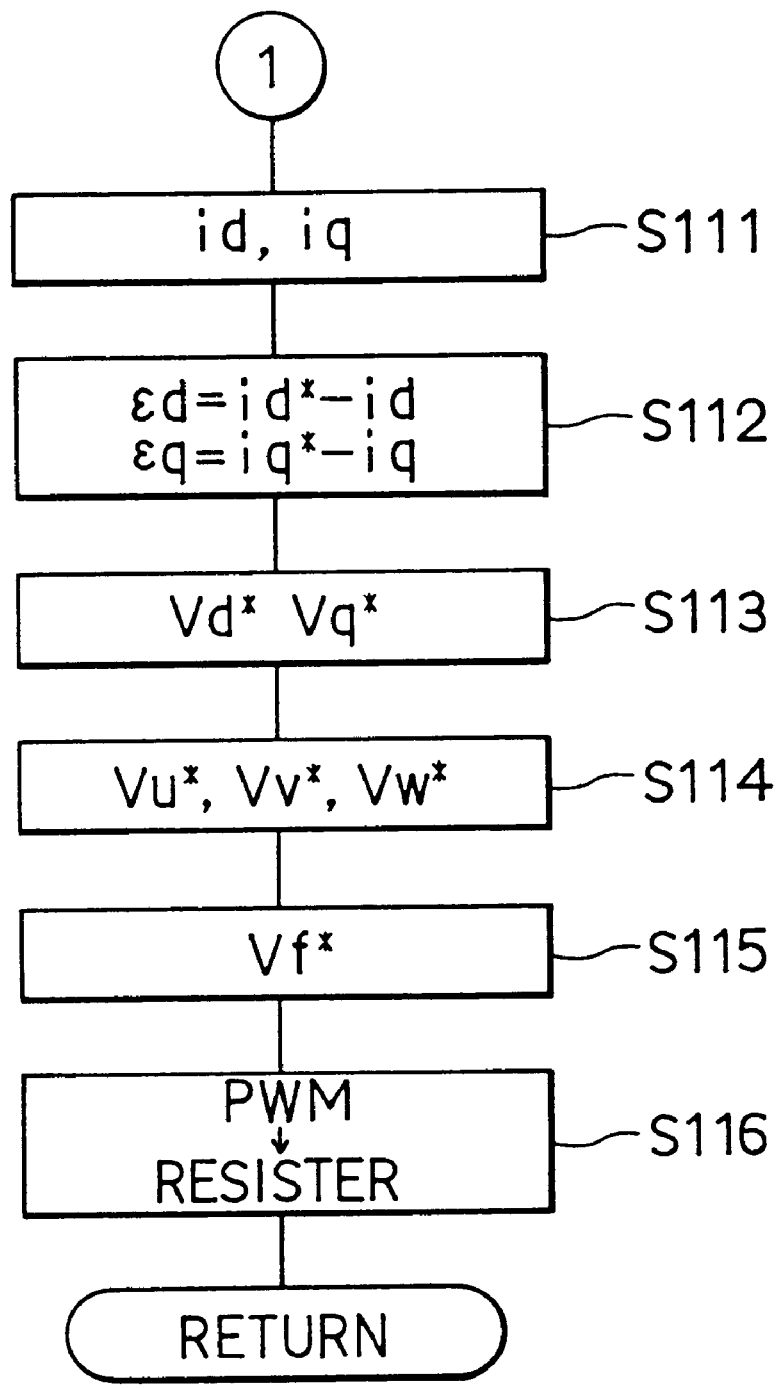
FIG. 6 is a flow diagram of another part of the main program.
Figure 7:
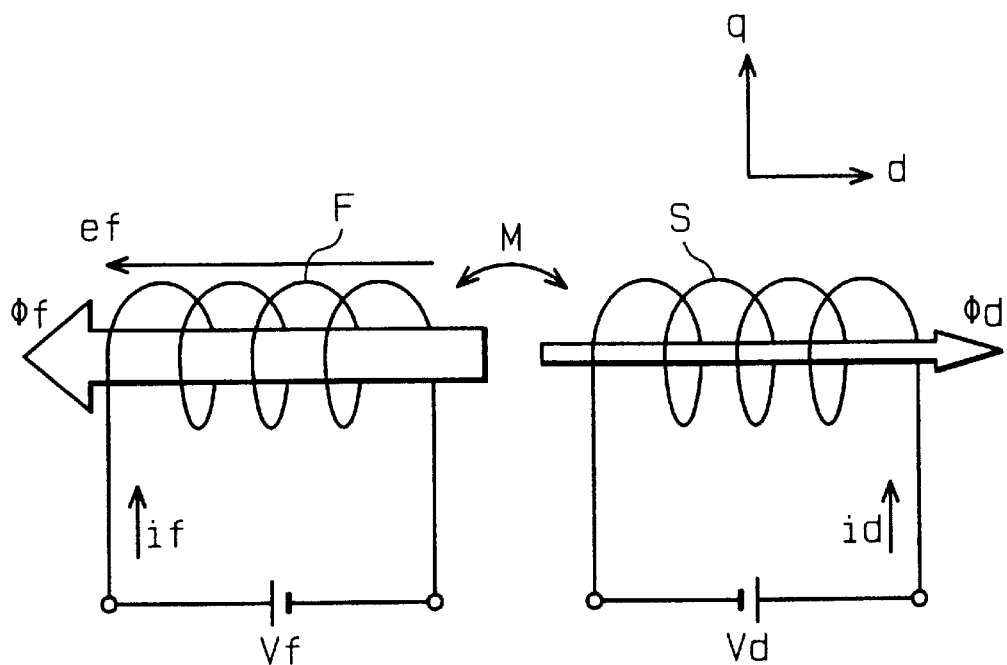
FIG. 7 illustrates a principle of the invention.

The main program is started when a vehicle ignition key switch is turned on. As shown in FIGS. 5 and 6, controller 100 reads torque command signal T* and motor rotation speed Nm at step S101. Torque command signal T* is generated when the accelerator pedal or brake pedal is operated. Motor rotation speed Nm is calculated from the signal of rotor position sensor 1930.

At step S102, controller 100 calculates basic amount id0 of the d-axis component of the armature current necessary to generate required output power of the motor 1000 at normal operation, target amount iq* of the q-axis component of the armature current (herein after referred to as q-axis current), and target amount if* of the field current (hereinafter referred to target field current) from current torque command signal T* and current motor rotation speed Nm with reference to a map stored in a ROM.

At step S103, controller 100 examine whether the vehicle is in the transient operation or not. If a level of torque command signal T* is a certain value higher or lower than the last level thereof, it is determined that the vehicle is accelerated, decelerated, or in a transient operation.

Otherwise, NO is provided at step S103, and controller 100 sets compensation amount idh of the d-axis component of the armature current (hereinafter referred to as d-axis compensation current) to "0". That is, no compensation is made on the armature current. Then step S108 follows.

On the other hand, if the vehicle is in the transient operation, YES is provided at step S103, and controller 100 calculates d-axis compensation current idh in step S105-107. Target total amount $\phi 0$ of the magnetic flux (hereinafter referred to as target total flux) in the air gap is calculated at step S105. Target total flux $\phi 0$ is calculated from the following expression [E3].

$$\phi 0 = \phi f0 + \phi d0 + \phi m = (Lf/Nf)\cdot if^* + (Mfd/Nd)\cdot id^* + \phi m \qquad [E3]$$

The above expression includes target field magnetic flux $\phi f0$ supplied from field winding 1230, target amount $\phi d0$ of the armature magnetic flux (hereinafter referred to target armature flux) generated by amount id0 of the d-axis component of basic armature current (hereinafter referred to as d-axis basic current), permanent magnet flux $\phi m$ supplied from permanent magnets 1280, self inductance Lf of field winding 1230, a mutual inductance between field winding 1230 and a d-axis component of armature winding 1110, the number of turns Nf of field winding 1230, the number of turns Nd of the d-axis component of armature winding 1110, target field current if*, and target amount id* of d-axis component of the armature current. Here, the basic armature current is supplied to generate a commanded output power (driving torque or battery charging energy) of the synchronous machine in the normal operation.

Target total flux $\phi 0$ can be selected from a map.

At step S106, controller 100 calculates an actual total amount $\phi 1$ of magnetic flux (hereinafter referred to as actual total flux) in the air gap, which is given by the following expression [E4].

Here, $\phi f1$ is an actual amount of the field magnetic flux (hereinafter referred to as actual field flux) supplied by field winding 1230, $\phi d1$ is an actual amount of the armature magnetic flux in the air gap generated by an amount id1 of the d-axis component of the armature current (hereinafter referred to as d-axis actual current).

$$\phi 1 = \phi f1 + \phi d1 + \phi m = (Lf/Nf)\cdot if1 + (Mfd/Nd)\cdot id1 + \phi m \qquad [E4]$$

In [E4], actual field current if1 and d-axis actual current, id1 are respectively calculated from amounts of U-phase current iu and W-phase current iw. However, actual total flux $\phi 1$ can be detected by a sensor 1115 such as a search coil disposed between stator 1100 and rotor 1200.

At step S107, controller 100 calculates d-axis compensation current idh to reduce a difference between target total flux $\phi 0$ and actual total flux $\phi 1$. This can be carried out by a well-known feedback system, feed forward system or a combination thereof.

At step S108, controller 100 adds d-axis basic current id0 and d-axis compensation current idh to obtain d-axis target current id*.

If the field current is sufficiently large, d-axis target current id* is controlled to induce a negative counter-electromotive force. On the other hand, if the field current is not large, the d-axis target current id* is controlled to induce a positive counter-electromotive force.

Thereafter, controller 100 reads amounts iu, iw of U-phase and W-phase armature current by current sensors 215, 216 at step S109 and reads rotor position θ at step S110.

At step S111, controller 100 calculates amounts id, iq of d-axis component and q-axis component of the armature current of the d-q rectangular coordinate axes from the detected amounts iu and iw.

At step S112, controller 100 provides current differences $\epsilon d$ and $\epsilon q$, where, $\epsilon d = id^* - id$, $\epsilon q = iq^* - iq$. At step 113, d-axis-component target voltage Vd* and q-axis-component target voltage Vq* are calculated from $\epsilon d$, $\epsilon q$ and electric constants of motor 1000. At step S114, controller 100 calculates target phase-voltages Vu*, Vv*, and Vw* from d-axis-component target voltage Vd* and q-axis-component target voltage Vq*. Then, controller 100 calculates target field-voltage Vf* from target field current if* and the resistance of field winding 1230 at step S115. At step S116, target phase-voltages Vu*, Vv*, and VW* and the target field voltage Vf* are modulated respectively to pulse width modulation (PWM) signals at frequency of 10 kHz, for example, and written into a PWM resistor to supply the calculated armature current and the field current.

Thus, field winding 1230 is prevented from impeding rise-up of the field magnetic flux.

Figure 8:
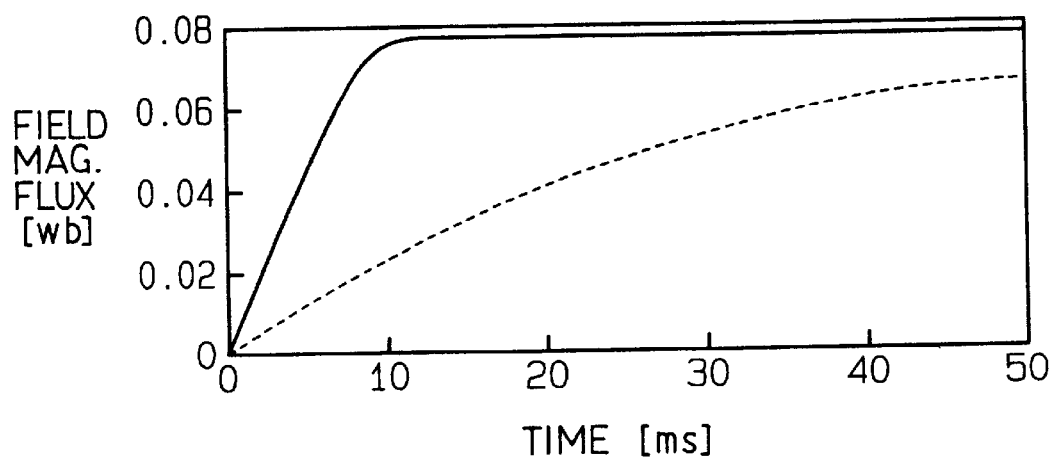
FIG. 8 is a graph showing changes in magnetic flux with time.

In FIG. 8, a solid line represents the magnetic flux in the air gap according to the embodiment of the invention, and a dotted line represents the magnetic flux in the air gap of a conventional apparatus. It is clear that the magnetic flux of the embodiment of the invention rises up much faster than that of the conventional apparatus.

Step S103 corresponds to the means for detecting transient operation, steps S102-108 correspond to armature current control means, and steps S105-108 correspond to the compensation means.

The calculation for the compensation can be replaced by a map based on changes in the magnetic flux and in the field current.

The present invention is applicable other than the control to system of a electric vehicle. For example, it can be applied to the control system of a hybrid vehicle or synchronous motors for use in devices other than vehicles.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A drive control apparatus for controlling an electric synchronous machine having a field winding and a multi-phase armature winding comprising:

detection means for detecting a torque command signal commanding output power of said synchronous machine;

judge means for judging transient operation of said synchronous motor according to said torque command signal;

field control means for supplying field current to said field winding; and armature control means for controlling basic armature current according to said torque command signal to provide commanded output power; wherein said armature control means adds an amount of compensation current component to said basic armature current to generate electromotive force in said field winding through a mutual inductance between said field winding and said armature winding to cancel counter-electromotive force generated when said judge means judges said transient operation.

2. The drive control apparatus as claimed in claim 1, wherein said detection means further detects actual armature current and total magnetic flux, and said armature control means calculates a target amount of magnetic flux necessary to provide said commanded output power, an amount of a component of said basic armature current generating said commanded output power and calculates said amount of compensation current component from a difference between said target magnetic flux and said actual magnetic flux.

3. The drive control apparatus as claimed in claim 1, wherein said detection means further detects actual armature current and actual field current, and said armature control means calculates a target amount of field current necessary to provide said commanded output power, an amount of a component of said basic armature current generating said commanded output power, and calculates said compensation current component from a difference between said target amount of field current and said actual field current.

4. The drive control apparatus as claimed in claim 1, wherein said armature control means controls said compensation current component to induce a negative counter-electromotive force when said field current is large enough to generate said commanded output power and a positive counter-electromotive force when said field current is not large enough to generate said commanded output power.

5. A method of controlling an electric synchronous machine having a field winding, a multi-phase armature winding comprising the steps of:

detecting a torque command signal commanding output power of said synchronous machine and rotation speed of said machine;

calculating a target amount of armature current necessary to generate commanded output power and a target amount of field current necessary to generate said commanded output power from said torque command signal and said rotation speed;

determining whether said synchronous machine is in transient operation or not according to said torque command signal;

calculating a target amount of total magnetic flux necessary to generate said commanded output power according to said torque command signal and said rotation speed;

detecting an actual amount of total magnetic flux;

calculating an amount of compensation current component of said armature current according to a difference between said target amount of said total magnetic flux and said actual amount of said total magnetic flux; and supplying said target amount of field current to said field winding and supplying said amount of compensation current component to said armature winding in addition to said basic amount of armature current when said synchronous machine is determined to be in transient operation.

6. The method as claimed in claim 5, wherein said armature winding is composed of three phase windings, and said three phase windings are supplied with respective amounts of phase current calculated from said target amount of armature current.

* * * * *